US011514247B2

(12) United States Patent
Fan et al.

(10) Patent No.: US 11,514,247 B2
(45) Date of Patent: Nov. 29, 2022

(54) METHOD, APPARATUS, COMPUTER DEVICE AND READABLE MEDIUM FOR KNOWLEDGE HIERARCHICAL EXTRACTION OF A TEXT

(71) Applicant: BAIDU ONLINE NETWORK TECHNOLOGY (BEIJING) CO., LTD., Beijing (CN)

(72) Inventors: Miao Fan, Beijing (CN); Sen Ye, Beijing (CN); Mingming Sun, Beijing (CN); Ping Li, Beijing (CN); Haifeng Wang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 492 days.

(21) Appl. No.: 16/713,062

(22) Filed: Dec. 13, 2019

(65) Prior Publication Data
US 2020/0380211 A1 Dec. 3, 2020

(30) Foreign Application Priority Data

May 31, 2019 (CN) .......................... 201910470354.5

(51) Int. Cl.
*G06F 17/00* (2019.01)
*G06F 40/30* (2020.01)
(Continued)

(52) U.S. Cl.
CPC ............ *G06F 40/30* (2020.01); *G06F 40/253* (2020.01); *G06K 9/6257* (2013.01);
(Continued)

(58) Field of Classification Search
CPC ...... G06F 40/30; G06F 40/253; G06F 40/205; G06F 16/3335; G06F 16/367;
(Continued)

(56) References Cited

U.S. PATENT DOCUMENTS 10,002,129 B1 * 6/2018 D'Souza ............... G06F 40/289
2005/0273314 A1 * 12/2005 Chang .................. G06F 40/289
704/4

(Continued)

OTHER PUBLICATIONS

Trouillon, Théo, et al. "Complex embeddings for simple link prediction." International conference on machine learning. PMLR, 2016 (Year: 2016).*

(Continued)

*Primary Examiner* — Andrew T McIntosh
(74) *Attorney, Agent, or Firm* — Lando & Anastasi, LLP

(57) ABSTRACT

A method, an apparatus, a computer device and a readable medium for knowledge hierarchical extraction of a text are disclosed. The method comprises: performing word segmentation on a designated text to obtain a word list, the word list including at least one word arranged in a sequence in the designated text; analyzing part-of-speech of each word in the word list in the designated text, to obtain a part-of-speech list corresponding to the word list; predicting a SPO triple included in the designated text according to the word list, the part-of-speech list and a pre-trained knowledge hierarchical extraction model. By the technical solutions, the SPO triple included in any designated text however loose its organization and structure is may be accurately extracted based on the pre-trained knowledge hierarchical extraction model. Compared to the prior art, the efficiency and accuracy of knowledge hierarchical extraction may be effectively improved.

17 Claims, 6 Drawing Sheets

(51) Int. Cl.
   *G06F 40/253* (2020.01)
   *G06K 9/62* (2022.01)
   *G06N 3/04* (2006.01)
   *G06N 5/02* (2006.01)

(52) U.S. Cl.
   CPC ........... *G06K 9/6265* (2013.01); *G06N 3/049* (2013.01); *G06N 5/022* (2013.01)

(58) Field of Classification Search
   CPC .... G06K 9/6257; G06K 9/6265; G06N 3/049; G06N 5/022; G06N 7/005; G06N 3/0445; G06N 3/0454; G06N 3/08; G06V 10/82
   See application file for complete search history.

(56) References Cited

U.S. PATENT DOCUMENTS

| | | | |
|---|---|---|---|
| 2011/0184718 A1* | 7/2011 | Chen | G06F 40/55 704/9 |
| 2018/0225281 A1* | 8/2018 | Song | G06F 40/30 |
| 2018/0232443 A1* | 8/2018 | Delgo | G06F 16/35 |
| 2018/0329883 A1* | 11/2018 | Leidner | G06F 40/247 |
| 2018/0330231 A1* | 11/2018 | Gu | G06N 5/041 |

OTHER PUBLICATIONS

Baier, Stephan, Yunpu Ma, and Volker Tresp. "Improving visual relationship detection using semantic modeling of scene descriptions." International Semantic Web Conference. Springer, Cham, 2017 (Year: 2017).*

Jiang, Xueyan, et al. "Link Prediction in Multi-relational Graphs using Additive Models." SeRSy 919 (2012): 1-12 (Year: 2012).*

Han, Chaojun, et al. "Visual spatial attention network for relationship detection." Proceedings of the 26th ACM international conference on multimedia. 2018 (Year: 2018).*

* cited by examiner atus, a computer device and a readable medium for knowledge hierarchical extraction of a text, to improve the accuracy of the knowledge hierarchical extraction.

METHOD, APPARATUS, COMPUTER DEVICE AND READABLE MEDIUM FOR KNOWLEDGE HIERARCHICAL EXTRACTION OF A TEXT

CROSS REFERENCE TO RELATED APPLICATIONS

The present application claims the priority of Chinese Patent Application No. 201910470354.5, filed on May 31, 2019, with the title of "Method, apparatus, computer device and readable medium for knowledge hierarchical extraction of a text". The disclosure of the above applications is incorporated herein by reference in its entirety.

TECHNICAL FIELD

The present disclosure generally relates to the technical field of computer application, and particularly to a method, an apparatus, a computer device and a readable medium for knowledge hierarchical extraction of a text.

BACKGROUND

With the development of network and computer technologies, information resources, with rich useable knowledge and high research value, are updated at a fast speed and in a massive number. On the premise of such big data and low density of information resources, knowledge extraction is of great research significance.

Knowledge extraction refers to extracting knowledge included in an information source through a process including recognition, understanding, screening and summarizing and so on, and storing the knowledge to form a knowledge element repository. That is, knowledge extraction means extracting knowledge content matched with a given ontology from a text based on the given ontology. Current networked and digitalized information resources mostly exist in a free, semi-structured or unstructured form, and the information is in a large amount and updated in real time. The knowledge extraction enables extracting the user-desired knowledge from the information by using a relevant technique and method, thereby achieving effective utilization of the information resources. Since knowledge extraction is widely applied, it exerts an unsubstitutable impact not only on public opinions, automatic question and answer and knowledge navigation that are involved by people in daily life, but also on professional field depictions, security protection computer network systems and so on. Extracting knowledge from massive information is a basis and an inexhaustible motivation for people to use and create knowledge, as well as a staircase for various information institutions and talents to step towards knowledge service and knowledge sharing service progress.

Current knowledge extraction involves knowledge hierarchical extraction mostly based on rules and leaning. However, as the big-data era comes, scientific and technological information is growing in an explosive manner and exhibits characteristics such as a large scale, heterogeneity and multi-variation, and loose organization and structure. The rule-based knowledge extraction cannot ensure the accuracy thereof, and causes a lower accuracy of the current knowledge hierarchical extraction manners.

SUMMARY

The present disclosure discloses a method, an apparatus, a computer device and a computer readable medium for knowledge hierarchical extraction of a text, to improve the accuracy of the knowledge hierarchical extraction.

An embodiment of the present disclosure discloses a method for knowledge hierarchical extraction of a text, which includes:

performing word segmentation on a designated text to obtain a word list, the word list including at least one word arranged in a sequence in the designated text;

analyzing part-of-speech of each word in the word list in the designated text, to obtain a part-of-speech list corresponding to the word list;

predicting a SPO triple included in the designated text according to the word list, the part-of-speech list and a pre-trained knowledge hierarchical extraction model.

An embodiment of the present disclosure discloses an apparatus for knowledge hierarchical extraction of a text, which includes:

a word segmentation module configured to perform word segmentation on a designated text to obtain a word list, the word list including at least one word arranged in a sequence in the designated text;

an analysis module configured to analyze part-of-speech of each word in the word list in the designated text, to obtain a part-of-speech list corresponding to the word list;

a prediction module configured to predict a SPO triple included in the designated text according to the word list, the part-of-speech list and a pre-trained knowledge hierarchical extraction model.

An embodiment of the present disclosure further discloses a computer device, which includes:

one or more processors, a memory for storing one or more programs, the one or more programs, when executed by said one or more processors, enable said one or more processors to implement the above-mentioned method for the knowledge hierarchical extraction of the text.

An embodiment of the present disclosure further discloses a computer readable medium on which a computer program is stored, the program, when executed by a processor, implementing the above-mentioned method for knowledge hierarchical of the text.

By the method, the apparatus, the computer device and the computer readable medium for knowledge hierarchical extraction of a text according to embodiments of the present disclosure, and through the above technical solutions, the SPO triple included in any designated text, however loose its organization and structure is, may be accurately extracted based on the pre-trained knowledge hierarchical extraction model. Compared to the prior art, the efficiency and accuracy of knowledge hierarchical extraction may be effectively improved. Furthermore, in the technical solution according to the embodiments of the present disclosure, the accurate SPO triple may be extracted without manual participation during the whole process, and thus the knowledge graph may be built based on the extracted SPO triple. Therefore, by the technical solution according to the embodiments of the present disclosure, the costs for building the knowledge graph may be effectively saved, thereby facilitating subsequent search and recommendation based on the knowledge graph.

DETAILED DESCRIPTION OF EMBODIMENTS

The present disclosure will be described in detail with reference to figures and specific embodiments to make objectives, technical solutions and advantages of the present disclosure more apparent.

Artificial intelligence, abbreviated as AI, is a new technological science which researches and develops theories, methods, techniques and application systems for simulating, extending and expanding human intelligence. Artificial intelligence, as a branch of computer science, is intended to learn about essence of intelligence and creates a new intelligent machine which is capable of responding in a manner similar to human intelligence. Research in the field includes robots, language recognition, image recognition, natural language processing, expert systems and the like. In the embodiments of the present disclosure, the knowledge hierarchical extraction of the text is implemented based on a neural network model in AI.

Figure 1:
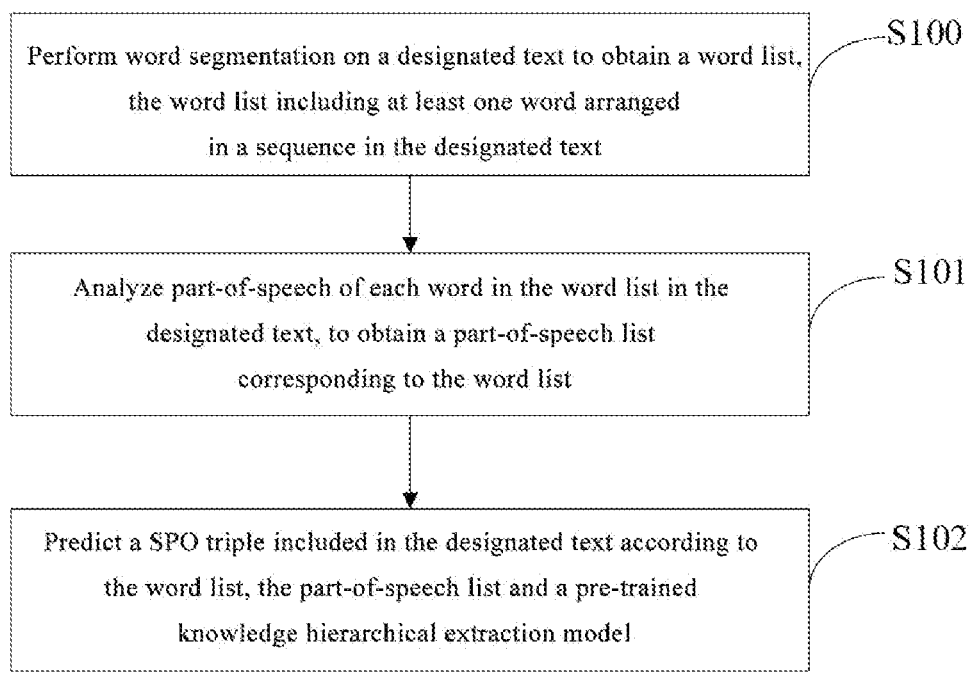
FIG. 1 is a flowchart of a method for knowledge hierarchical extraction of a text according to an embodiment of the present disclosure.

FIG. 1 is a flowchart of a method for knowledge hierarchical extraction of a text according to an embodiment of the present disclosure. As shown in FIG. 1, the method for knowledge hierarchical extraction of a text according to this embodiment may specifically include the following steps:

S100: performing word segmentation on a designated text to obtain a word list, the word list including at least one word arranged in a sequence in the designated text;

A subject for performing the method for knowledge hierarchical extraction of the text according to this embodiment is an apparatus of knowledge hierarchical extraction of the text. The apparatus may be an independent electronic entity, or may be an application which is integrated with software and may implement the knowledge hierarchical extraction of the text by running on a hardware device such as a computer upon use.

The method for knowledge hierarchical extraction of the text according to this embodiment is used for knowledge hierarchical extraction from a designated text, for example, extract a SPO triple from the designated text in this embodiment. Specifically, the SPO triple of this embodiment includes a Subject (S), an Object (O) and a Predicate (P) which is a relationship between the subject and the object, that is to say, the SPO triple of this embodiment may also be understood as a subject-relationship-object triple. The SPO triple extracted by employing the technical solution of this embodiment may be used to build a knowledge graph, reduce the manpower costs for building the knowledge graph in the prior art, and implement more precise search and recommendation based on the knowledge graph.

The designated text of this embodiment is any text to be extracted. In this embodiment, a process of performing word segmentation on the designated text to obtain a word list may be implemented simply. Specifically, word segmentation is performed for at least one word of the designated text in a sequence without making any deletion or filtering process, so as to obtain a word list consisting of at least one word arranged in a sequence in the designated text.

S101: analyzing part-of-speech of words in the word list in the designated text, to obtain a part-of-speech list corresponding to the word list;

As for the word list obtained in step S100, the part-of-speech of words in the designated text may be analyzed. The part-of-speech in this embodiment may be verb, noun, preposition, pronoun, interjection and so on. Then, the part-of-speech of respective words is arranged according to the sequence of the words in the word list, to obtain the part-of-speech list corresponding to the word list.

S102: predicting the SPO triple included in the designated text according to the word list, the part-of-speech list and a pre-trained knowledge hierarchical extraction model.

Finally, in this embodiment, the obtained word list and part-of-speech list are input into the pre-trained knowledge hierarchical extraction model, and the knowledge hierarchical extraction model may predict the SPO triple included in the designated text. In practical application, as for the same designated text, the knowledge hierarchical extraction model may extract one, two or more SPO triples.

Further optionally, after the SPO triple is extracted from the knowledge hierarchical extraction model, the extracted SPO triple may be further verified. For example, the verification may include the following steps:

As for each target SPO extracted by the knowledge hierarchical extraction model, it is feasible to judge, according to a preset parameter set, whether the predicted SPO triple complies with a SPO triple structure preset in the parameter set, the parameter set including at least one preset SPO triple structure, each preset SPO triple structure including content of the relationship P, and types of the subject S and the object O; if the predicted SPO triple complies with the SPO triple structure preset in the parameter set, determine that the SPO triple is the target SPO triple of the designated text; otherwise, delete the SPO triple.

Specifically, the parameter set of this embodiment may also be referred to as a schema set, and the schema set includes at least one preset SPO triple structure, each preset SPO triple structure including content of the relationship P, and a type of the subject S and a type of the object O; for example, the schema set of this embodiment may include SPO triple structures shown in the first three columns of Table I as follows. Then, it is feasible to, according to the preset schema set, judge whether the predicted SPO triple complies with any preset SPO triple structure in the parameter set; if the predicted SPO triple complies with a preset SPO triple structure in the parameter set, determine that the SPO triple is the target SPO triple of the designated text; otherwise, delete the SPO triple directly.

In this embodiment, types of the subject S and the object O are specifically a class of a certain field, for example, the following Table I provides examples of some types of the subject S, the relationship P and types of the object O and some SOP triples.

TABLE I

| Type of the subject S | Relationship P | Type of the object O | Examples |
| --- | --- | --- | --- |
| Location | Altitude | Number | {"object_type": "Number", "predicate": "altitude", "object": "2,240 meters", "subject_type": "location", "subject": "Casablanca volcano"} |
| TV variety show | Guest | Character | {"object_type": "character", "predicate": "guest", "object": "Xiaohu Huang", "subject_type": "TV variety show", "subject": " Celebrity Battle"} |
| TV variety show | Anchor | Character | {"object_type": "character", "predicate": "host", "object": "Sa Beining", "subject_type": "TV variety show", "subject": "Dream Star Partner"} |
| Song | Singer | Character | {"object_type": "character", "predicate": "singer", "object": "Keqin Li", "subject_type": "song", "subject": " Love Can't Let Go"} |
| Song | Album | Music album | {"object_type": "music album", "predicate": "album", "object": " Love Can't Let Go New Town Sings Music Party ", "subject_type": "song", "subject": " Love Can't Let Go "} |
| Song | Lyricist | Character | {"object_type": "character", "predicate": "lyricist", "object": "Xi Lin", "subject_type": "song", "subject": " Love Can't Let Go "} |
| Song | Composer | character | {"object_type": "character", "predicate": "composer", "object": "Huiyang Chen", "subject_type": "song", "subject": "Love Can't Let Go"} |
| Country | Official language | language | {"object_type": "language", "predicate": "official language", "object": "Italian language", "subject_type": "country", "subject":"Italy"} |
| State | Capital | City | {"object_type": "city", "predicate": "capital", "object": "yáng xié miē chéng", "subject_type": "country", "subject": "Ancient Dali state in China"} |
| Administrative region | Area | Number | {"object_type": "Number", "predicate": "area", "object": "188 square kilometers", "subject_type": "administrative region", "subject": "Hexi Town"} |

Further optionally, the knowledge hierarchical extraction model of this embodiment may include an embedded layer, a Stacked Recurrent Neural Network (SRNN) layer, two pre-trained fully-connected layers and a Conditional Random Field (CRF) network layer.

Correspondingly, step S102 of this embodiment predicting the SPO triple included in the designated text according to the word list, a part-of-speech list and a pre-trained knowledge hierarchical extraction model may specifically include: inputting the word list and the part-of-speech list into the knowledge hierarchical extraction model, the embedded layer obtaining a corresponding word embedding expression based on the word list and a pre-trained word vector list; obtaining a corresponding part-of-speech embedding expression based on the part-of-speech list and a pre-trained part-of-speech vector list; the pre-trained SRNN layer obtaining a bottom layer embedding expression which is of the designated text and carries context information, based on the word embedding expression and the part-of-speech embedding expression; and through the two pre-trained fully-connected layers in turn, predicting a prediction relationship which is included in the designated text and whose prediction probability is greater than a preset probability threshold; further inputting the bottom layer embedding expression, the prediction probability of the prediction relationship and a feature expression corresponding to the prediction relationship into the pre-trained CRF network for sequence marking, and obtaining the subject and object corresponding to the prediction relationship; and outputting the SPO triple consisting of the subject, the object and the prediction relationship.

Figure 2:
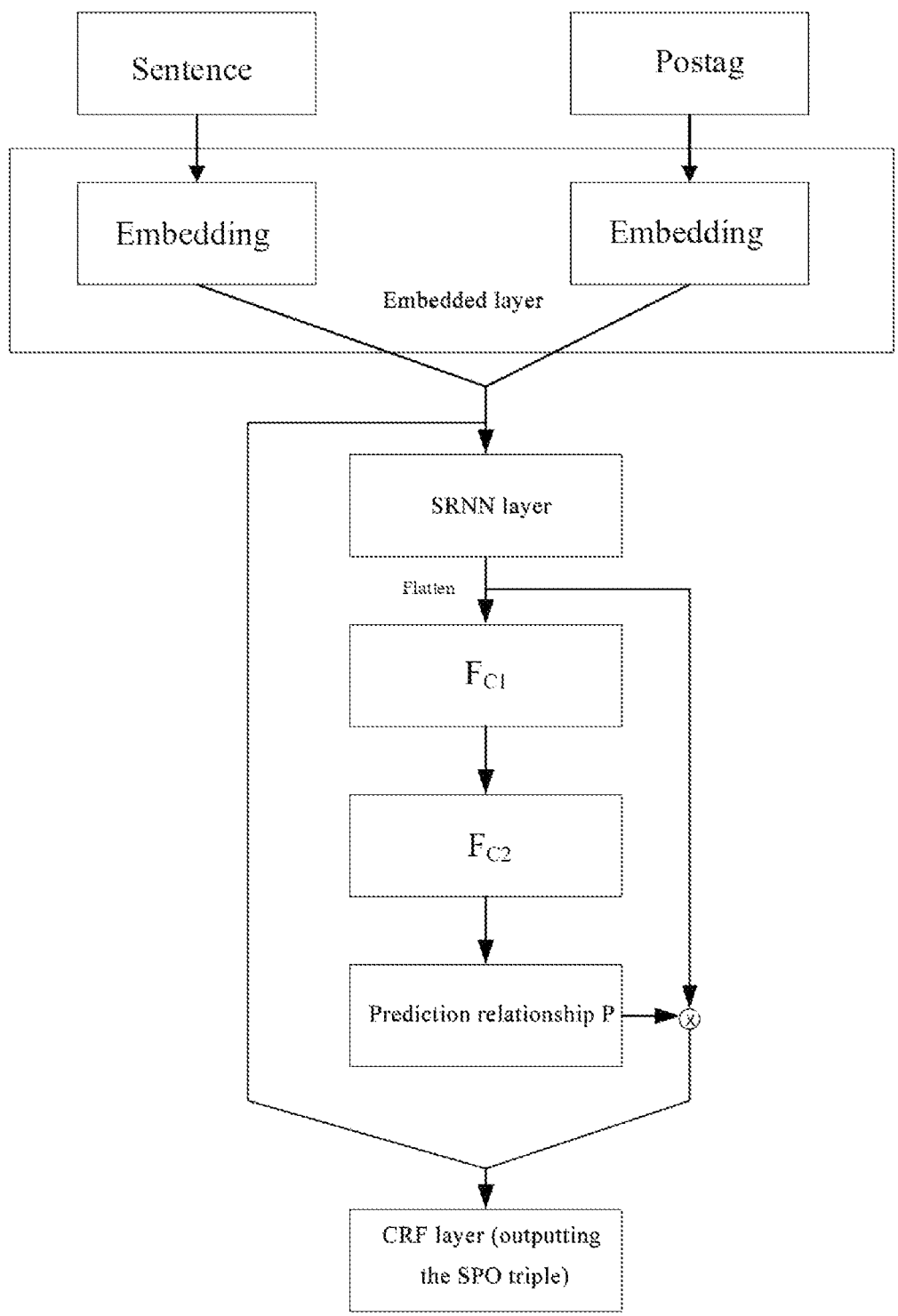
FIG. 2 is a schematic diagram of a knowledge hierarchical extraction model according to an embodiment of the present disclosure.

FIG. 2 is a schematic diagram of a knowledge hierarchical extraction model according to an embodiment of the present disclosure. As shown in FIG. 2, assuming that a sentence (sentence, S) for extraction includes n segmented words, after the word segmentation, a segmented word embedding matrix is built in the embedding layer, then a word vector S corresponding to each segmented word is obtained by looking up a pre-trained word vector table, $S \in R^{n \times l}$, wherein l is a dimension of the word vector; likewise, a postag T with the same length includes n tags; tags in this embodiment may be the part-of-speech of each word in the sentence, for example, verb, noun, pronoun and proposition, etc. Then, look up the pre-trained part-of-speech vector table to obtain a word vector T corresponding to each segmented word, $T \in R^{n \times h}$, wherein h is a dimension of the tag vector. The sentence S and tag T are input into the pre-trained SRNN layer, and encoded to obtain an output $M_{emb} \in R^{n \times k}$, wherein k is a preset parameter. It may be appreciated that what is obtained through the SRNN processing is the bottom layer embedding expression which is of the sentence S and carries context information. Then, go through the processing of the fully-connected layer 1 (namely, $F_{C1}$) to obtain $F_{emb} \in R^{n \times c}$, wherein c is a preset total number of relationships, then it is deployed through Flatten operation into (n×c)×1 vectors which are then input into the fully-connected layer 2 ($F_{C2}$) for processing to obtain c×1 vectors, and finally go through a sigmoid function to obtain a possible probability of each preset relationship, and define a relationship whose probability is greater than 0.5 after the sigmoid function operation as the P predicted by the model.

As shown in FIG. 2, it is further feasible to perform sequence marking for the sentence according to the bottom layer embedding expression of the sentence S and features corresponding the above predicted relationships, and then select respective SO pairs to constitute SPO triples.

Specifically, it is feasible to subject the predicted relationships P to a sampling operation, randomly extract one of the predicted relationships P, then decode it into a vector in a one-hot form; for example, if the total number C of relationships is 49, the dimensions of the corresponding vector may be 49×1, a value at the corresponding relationship is 1, the remaining is 0, then the vector in the one-hot form and the output $F_{emb}$ of the fully-connected layer 1 are multiplied to obtain the embedding feature expression of the corresponding relationship, its dimension may be n×1, then the embedding feature expression is spliced with the code $M_{emb}$, namely, the bottom layer embedding expression of the SRNN layer to obtain a vector in n×(k+1) dimensions, it is input into the CRF layer for sequence marking to obtain the predicted SO pair, and finally obtain the SPO triple.

Figure 3:
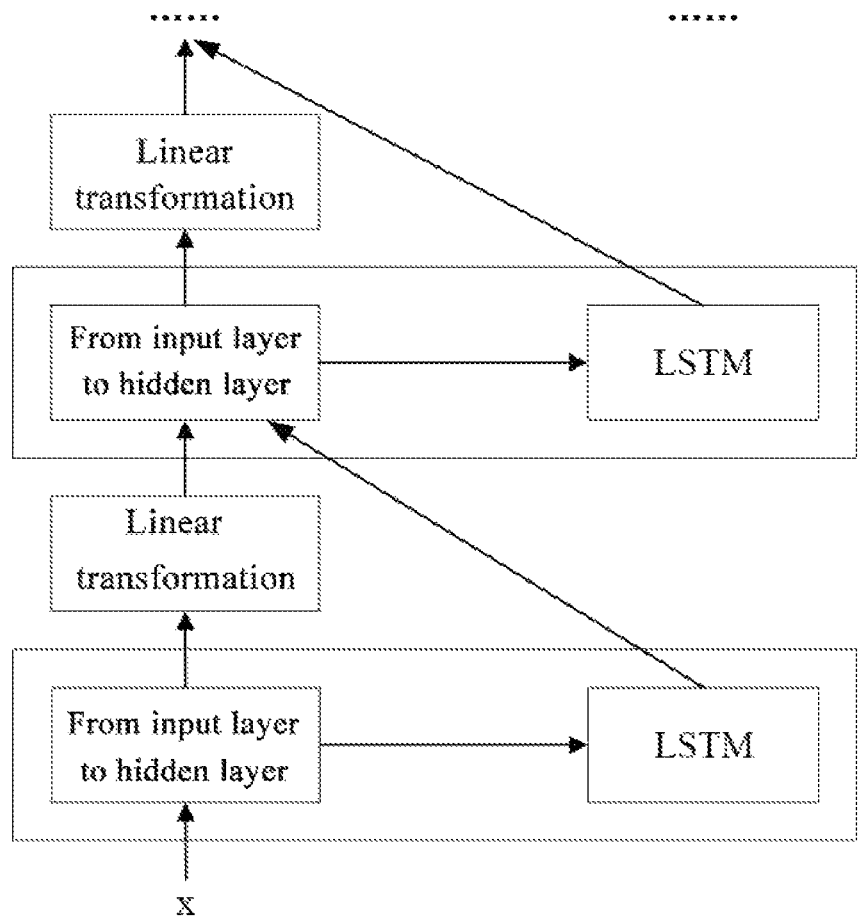
FIG. 3 is a structural diagram of an SRNN according to an embodiment of the present disclosure.

For example, FIG. 3 is a structural diagram of an SRNN according to an embodiment of the present disclosure. Specifically, the SRNN is an SRNN based on a Long Short-Term Memory (LSTM) network. As shown in FIG. 3, in the LSTM, a hidden layer vector at time t encodes all input information until the time t, but the LSTM at the time t may see history but cannot see the future. The ellipsis in FIG. 3 is the same repeated layer, and specifically there may be a plurality of repeated layers. In a majority of natural language processing tasks, a whole sentence can be almost always obtained. In this case, if future information can be obtained as obtaining the historical information, this is of great help for the sequence learning task. To overcome the drawback, the SRNN layer of this embodiment is a LSTM-based bidirectional recurrent network unit. Its idea is simple and direct: making a tiny amendment to the SRNN of FIG. 3, stack a plurality of LSTM units, allowing each layer of LSTM units to learn an output sequence of a previous layer in a forward, backward, forward, . . . sequence respectively. Therefore, starting from the second layer, the LSTM unit at the time t may always see historical and future information.

Figure 4:
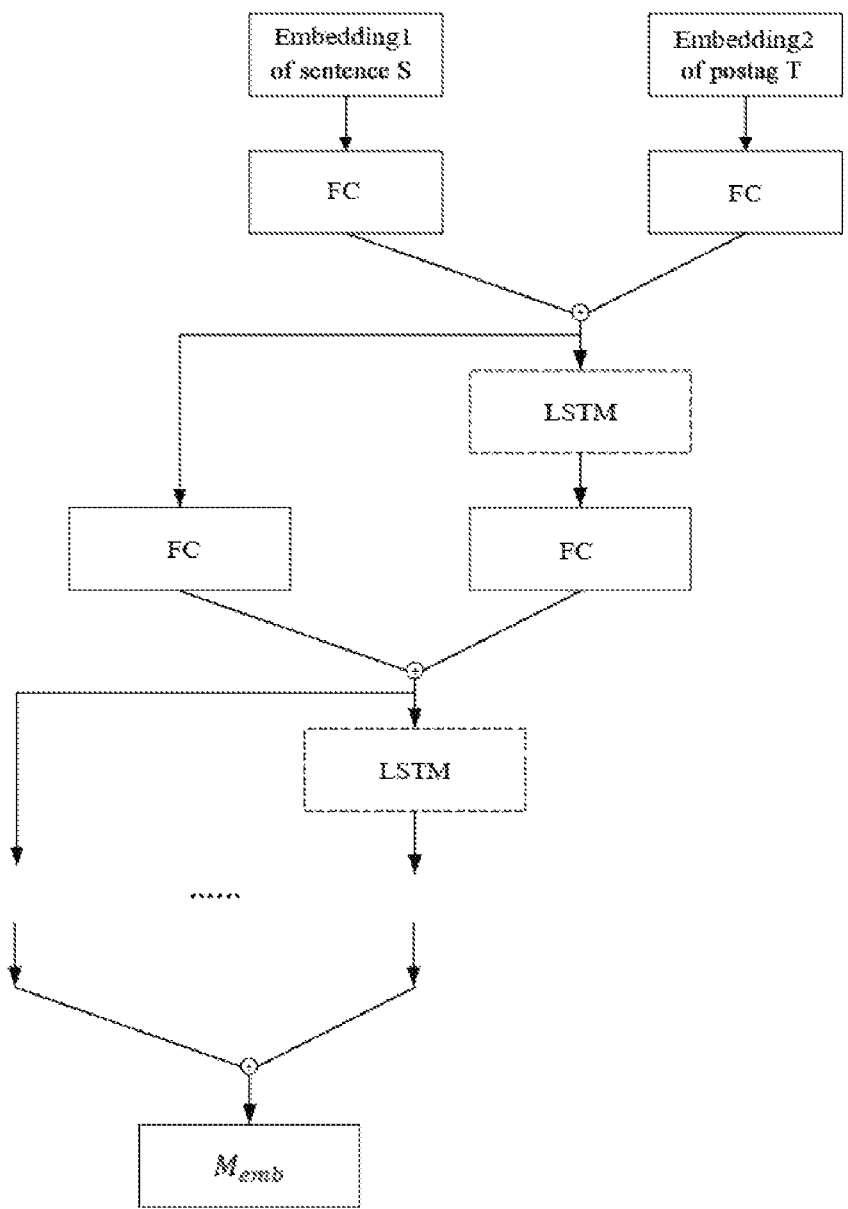
FIG. 4 is a structural diagram of another SRNN according to an embodiment of the present disclosure.

For example, FIG. 4 is a structural diagram of another SRNN according to an embodiment of the present disclosure. As shown in FIG. 4, the SRNN is of the above improved network structure, and may specifically applied to the knowledge hierarchical extraction model of this embodiment.

The sentence $S \in R^{n \times l}$ and tag $T \in R^{n \times h}$ are respectively input into the fully-connected layer (FC), the outputs are both n×f, wherein f is an output dimension of the fully-connected neural network, the two outputs are summated through a sum operation to obtain a n×f hidden1 vector, then it is input into the LSTM to obtain two n×d outputs (a hidden state and a cell state of the LSTM), where d is the number of hidden units of the LSTM, then the hidden vector and the two outputs of the LSTM are respectively input into the fully-connected layer (FC) . . . and so on, totally 8 layers, and finally the output of the hidden8 and the output of the LSTM are summated through a sum operation to obtain an n×k-dimensioned coding matrix $M_{emb}$.

According to the method for knowledge hierarchical extraction of the text according to the embodiment and through the above technical solution, the SPO triple included in any designated text, however loose its organization and structure is, may be accurately extracted based on the pre-trained knowledge hierarchical extraction model. As compared with the prior art, the method according to the embodiment of the present disclosure may effectively improve the efficiency and accuracy of knowledge hierarchical extraction. Furthermore, in the technical solution of this embodiment, accurate SPO triple may be extracted without manual participation during the whole process, so that the knowledge graph may be built based on the extracted SPO triple. Therefore, according to the technical solution of the embodiment of present embodiment, the costs of building the knowledge graph may be effectively reduced and subsequent search and recommendation based on the knowledge graph may be facilitated.

Figure 5:
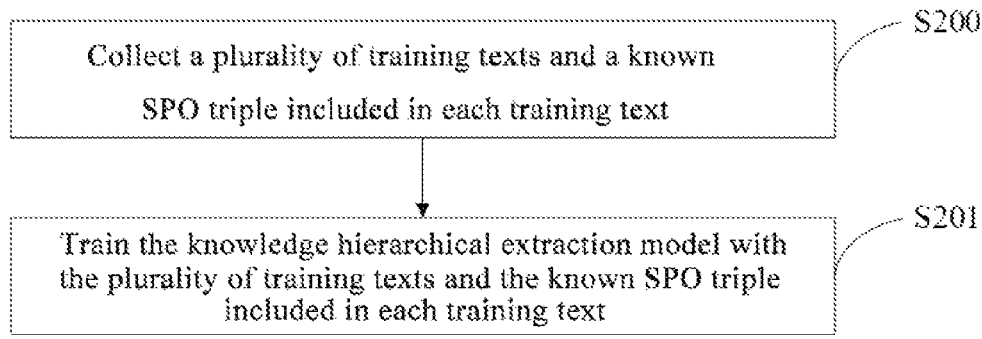
FIG. 5 is a flowchart of a method for knowledge hierarchical extraction of a text according to an embodiment of the present disclosure.

FIG. 5 is a flowchart of a method for knowledge hierarchical extraction of a text according to an embodiment of the present disclosure. As shown in FIG. 5, the method for knowledge hierarchical extraction of a text according to this embodiment may specifically include the following steps:

S200: collecting a plurality of training texts and a known SPO triple included in each training text;

S201: training a knowledge hierarchical extraction model with the training texts and the known SPO triples included in each training text.

In this embodiment, pre-collect a plurality of training texts, each of which may be a sentence, may be pre-collected. Meanwhile, the known SPO triple marked for each training text may also be collected. In practical application, the known SPO triple may be marked manually according to respective SPO triple structures in the parameter set.

In this embodiment, the number of the collected training texts may be over the order of million. The larger the number of the collected training texts is, the more accurate the trained knowledge hierarchical extraction model is, the more accurate the extracted SPO triple is.

For example, training a knowledge hierarchical extraction model with the training texts and the known SPO triples in the training texts in step S201 may specifically include the following steps:

(a) performing word segmentation for each training text to obtain a training word list; the training word list including at least one training word arranged in a sequence in the training text;

In this embodiment, a manner of obtaining the training word list of the training text is identical with the manner of obtaining the word list of the designated text in step S100 of the embodiment shown in FIG. 1, and will not be detailed any more here.

(b) analyzing a part-of-speech of each training word in the training word list in the training text to obtain a training part-of-speech list corresponding to the training word list;

Likewise, a manner of obtaining the training part-of-speech list is identical with the manner of obtaining the part-of-speech list of the designated text in step S101 of the embodiment shown in FIG. 1, and will not be detailed any more here.

(c) training a knowledge hierarchical extraction model according to the lists of training words and the training part-of-speech lists of respective training texts and known SPO triples in respective training texts.

For example, the step (c) training a knowledge hierarchical extraction model according to the lists of training words and the training part-of-speech lists of respective training texts and known SPO triples in respective training texts may specifically include the following steps:

(1) initializing the word vector list, the part-of-speech vector list, parameters of the SRNN layer, parameters of the fully-connected layers and parameters of the CRF network layer in the knowledge hierarchical extraction model;

Specifically, a random value may be employed to initialize values of respective parameters.

(2) inputting the lists of training words, the training part-of-speech list and known SPO triples of respective training texts into the knowledge hierarchical extraction model, to obtain predicted SPO triples output by the knowledge hierarchical extraction model;

A process of obtaining the predicted SPO triples is the same as the principle of implementing step S102 in the embodiment shown in FIG. 1. Reference may be made to the depictions of the above embodiment for details. Details are not presented any more here.

(3) calculating a value of a loss function according to corresponding known SPO triples and predicted SPO triples;

The loss function in this embodiment may be built in a gradient descent method. The whole training process may also be referred to as model training based on gradient descent method.

(4) judging whether the value of the loss function is greater than or equal to a preset threshold; the value of the loss function is greater than or equal to a preset threshold, performing step (5); otherwise, performing step (6);

(5) adjusting the word vector list, the part-of-speech vector list, parameters of the SRNN layer, parameters of the fully-connected layers and parameters of the CRF network layer in the knowledge hierarchical extraction model to make the loss function smaller than the preset threshold;

It is to be noted that in practical application, it is possible, in each round of training, to adjust a plurality of parameters simultaneously, or adjust only one parameter, and then correspondingly adjust another parameter in next round of training, and finally adjust the plurality of parameters in turn in the same way.

(6) repeating the above steps (2)-(5), and constantly training the knowledge hierarchical extraction model with the lists of training words and the training part-of-speech lists and known SPO triples of respective training texts in the above manner until training times reach a preset training time threshold, or the value of the loss function is always smaller than a preset threshold within a range of the preset training times and, determining the word vector list, the part-of-speech vector list, parameters of the SRNN layer, parameters of the fully-connected layers and parameters of the CRF network layer in the knowledge hierarchical extraction model, and thereby determining the knowledge hierarchical extraction model.

Training conditions in these embodiments may include two manners. One manner is detecting training times: if the training times reach the preset threshold, it may be considered that the training times are sufficient, whereupon the model is certainly already duly trained, and it is possible to determine the word vector list, the part-of-speech vector list, parameters of the SRNN layer, parameters of the fully-connected layers and parameters of the CRF network layer in the knowledge hierarchical extraction model, thereby determining the knowledge hierarchical extraction model. Alternatively, the other manner may be employed: judging that the value of the loss function is always smaller than the preset threshold in a range of consecutive preset times, for example, the value of the loss function is always smaller than the preset threshold in consecutive 100 times, 80 times or in a range of other consecutive times, whereupon it may be considered that the training of the knowledge hierarchical extraction model is completed, and whereupon it is possible to determine respective parameters in the knowledge hierarchical extraction model and thereby determine the knowledge hierarchical extraction model.

The subject performing the method for knowledge hierarchical extraction in the text in this embodiment is consistent with the above FIG. 1, and the method is also implemented by the apparatus for knowledge hierarchical extraction of the text. That is, the apparatus for knowledge hierarchical extraction of the text first trains the knowledge hierarchical extraction model, and then the apparatus for knowledge hierarchical extraction of the text implements the knowledge hierarchical extraction of the text by employing the technical solution of the embodiment of the above FIG. 1 based on the duly-trained knowledge hierarchical extraction model.

Optionally, the subject performing the method for knowledge hierarchical extraction in the text in this embodiment may be different from the subject in the embodiment shown in FIG. 1, and may be an apparatus for training the knowledge hierarchical extraction model independent from the apparatus for knowledge hierarchical extraction of the text. Upon specific use, the apparatus for training the knowledge hierarchical extraction model first trains the knowledge hierarchical extraction model, then upon performing knowledge hierarchical extraction of the text, the apparatus for knowledge hierarchical extraction of the text directly calls the duly-trained knowledge hierarchical extraction model, and implements the knowledge hierarchical extraction of the text by employing the technical solution of the embodiment shown in the above FIG. 1.

According to the method for knowledge hierarchical extraction of the text according to this embodiment and the above technical solution, the knowledge hierarchical extraction model is trained so that subsequently, the SPO triple of the text may be extracted accurately based on the duly-trained knowledge hierarchical extraction model, thereby implementing the knowledge hierarchical extraction of the text. The technical solution of this embodiment may effectively ensure the accuracy of the trained knowledge hierarchical extraction model, and thereby effectively improve the efficiency and accuracy of the knowledge hierarchical extraction upon knowledge hierarchical extraction based on the knowledge hierarchical extraction model.

Figure 6:
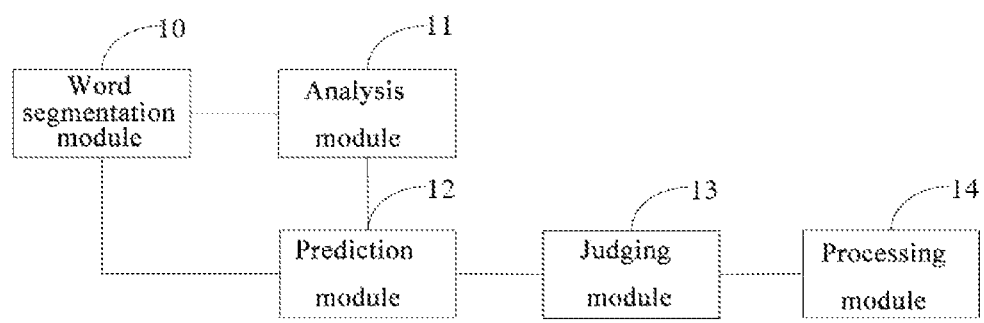
FIG. 6 is a structural diagram of an apparatus for knowledge hierarchical extraction of a text according to an embodiment of the present disclosure.

FIG. 6 is a structural diagram of an apparatus for knowledge hierarchical extraction of a text according to an embodiment of the present disclosure. As shown in FIG. 6, the apparatus for knowledge hierarchical extraction of a text of this embodiment may specifically include:

a word segmentation module 10 configured to perform word segmentation on a designated text to obtain a word list, the word list including at least one word arranged in a sequence in the designated text;

an analysis module 11 configured to analyze part-of-speech of words in the word list in the designated text obtained by the word segmentation module 10, to obtain a part-of-speech list corresponding to the word list;

a prediction module 12 configured to predict a SPO triple included in the designated text according to the word list obtained by the word segmentation module 10, the part-of-speech list obtained by the analysis module 11 and a pre-trained knowledge hierarchical extraction model.

Principles employed by the apparatus for knowledge hierarchical extraction of the text according to this embodiment to implement the knowledge hierarchical extraction of the text by using the above modules and the resultant technical effects are the same as those of the above-mentioned method embodiments. For particulars, please refer to the depictions of the aforesaid relevant method embodiments, and no detailed depictions will be presented here.

Optionally, as shown in FIG. 6, the apparatus for knowledge hierarchical extraction of the text in the above embodiment may further include:

a judging module 13 configured to judge, according to a preset parameter set, whether the SPO triple predicted by the prediction module 12 complies with a SPO triple structure preset in the parameter set, the parameter set including at least one preset SPO triple structure, each preset SPO triple structure including content of a relationship, and types of a subject and an object;

a processing module 14 configured to, based on the judgment of the judging module 13, if the SPO triple predicted by the prediction module 12 complies with a SPO triple structure preset in the parameter set, determine that the SPO triple is a target SPO triple of the designated text; otherwise, delete the SPO triple.

Optionally, in the apparatus for knowledge hierarchical extraction of the text in the above embodiment, the prediction module 12 may be further configured to:

input the word list and the part-of-speech list into the knowledge hierarchical extraction model, an embedded layer obtaining a corresponding word embedding expression based on the word list and a pre-trained word vector list; obtain a corresponding part-of-speech embedding expression based on the part-of-speech list and a pre-trained part-of-speech vector list; a pre-trained Stacked Recurrent Neural Network layer obtaining a bottom layer embedding expression which is of the designated text and carries context information, based on the word embedding expression and the part-of-speech embedding expression; and through two pre-trained fully-connected layers in turn, predict a prediction relationship which is included in the designated text and whose prediction probability is greater than a preset probability threshold; further input the bottom layer embedding expression, the prediction probability of the prediction relationship and a feature expression corresponding to the prediction relationship into a pre-trained conditional random field network for sequence marking, and obtain the subject and object corresponding to the prediction relationship; and output the SPO triple consisting of the subject, the object and the prediction relationship.

Figure 7:
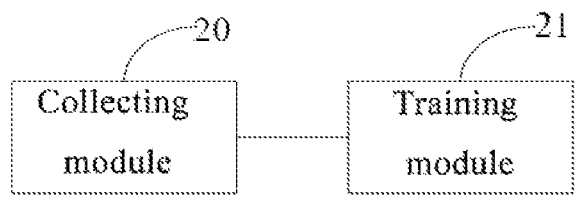
FIG. 7 is a structural diagram of an apparatus for knowledge hierarchical extraction of a text according to an embodiment of the present disclosure.

FIG. 7 is a structural diagram of an apparatus for knowledge hierarchical extraction of a text according to an embodiment of the present disclosure. As shown in FIG. 7, the apparatus for knowledge hierarchical extraction of a text of this embodiment may specifically include:

a collecting module 20 configured to collect a plurality of training texts and a known SPO triple included in each training text;

a training module 21 configured to train a knowledge hierarchical extraction model with the training texts and the known SPO triple included in each training text collected by the collecting module 20.

Optionally, the training module 21 may be further configured to:

perform word segmentation for each training text to obtain a training word list; the training word list including at least one training word arranged in a sequence in the training text;

analyze a part-of-speech of each training word in the training word list in the training text to obtain a training part-of-speech list corresponding to the training word list;

train a knowledge hierarchical extraction model according to the lists of training words and the training part-of-speech lists of respective training texts and known SPO triples in respective training texts.

Optionally, the training module 21 may be further configured to:

initialize the word vector list, the part-of-speech vector list, parameters of the Stacked Recurrent Neural Network layer, parameters of the fully-connected layers and parameters of the conditional random field network layer in the knowledge hierarchical extraction model;

input the lists of training words, the training part-of-speech list and known SPO triples of respective training texts into the knowledge hierarchical extraction model, to obtain predicted SPO triples output by the knowledge hierarchical extraction model;

calculate a value of a loss function according to corresponding known SPO triples and predicted SPO triples;

judge whether the value of the loss function is greater than or equal to a preset threshold;

if the value of the loss function is greater than or equal to a preset threshold, adjust the word vector list, the part-of-speech vector list, parameters of the Stacked Recurrent Neural Network layer, parameters of the fully-connected layers and parameters of the conditional random field network layer in the knowledge hierarchical extraction model to make the loss function smaller than the preset threshold;

repeat the above steps, and constantly train the knowledge hierarchical extraction model with the lists of training words, the training part-of-speech lists and known SPO triples of respective training texts in the above manner until training times reach a preset training time threshold, or the value of the loss function is always smaller than a preset threshold within a range of consecutive preset times, determine the word vector list, the part-of-speech vector list, parameters of the Stacked Recurrent Neural Network layer, parameters of the fully-connected layers and parameters of the conditional random field network layer in the knowledge hierarchical extraction model, and thereby determine the knowledge hierarchical extraction model.

It is to be noted that the apparatus for knowledge hierarchical extraction of the text of this embodiment may be implemented independently, to train the knowledge hierarchical extraction model, or may be combined with the above FIG. 6 respectively to form an optional embodiment of the present disclosure.

Principles employed by the apparatus for knowledge hierarchical extraction of the text according to this embodiment to implement the knowledge hierarchical extraction of the text by using the above modules and the resultant technical effects are the same as those of the above-mentioned method embodiments. For particulars, please refer to the depictions of the aforesaid relevant method embodiments, and no detailed depictions will be presented here.

Figure 8:
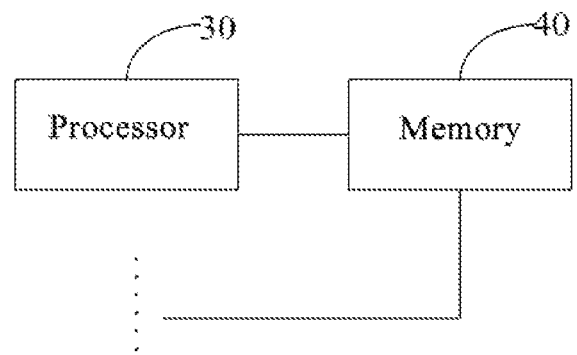
FIG. 8 is a structural diagram of a computer device according to an embodiment of the present disclosure.

FIG. 8 is a structural diagram of a computer device according to an embodiment of the present disclosure. As shown in FIG. 8, the computer device according to this embodiment includes: one or more processors 30, and a memory 40 for storing one or more programs; the one or more programs stored in the memory 40, when executed by said one or more processors 30, enable said one or more processors 30 to implement the method for knowledge hierarchical extraction of the text of the embodiment shown in FIG. 1 or FIG. 5. In the embodiment as shown FIG. 8, an example is taken in which the computer device includes a plurality of processors 30.

Figure 9:
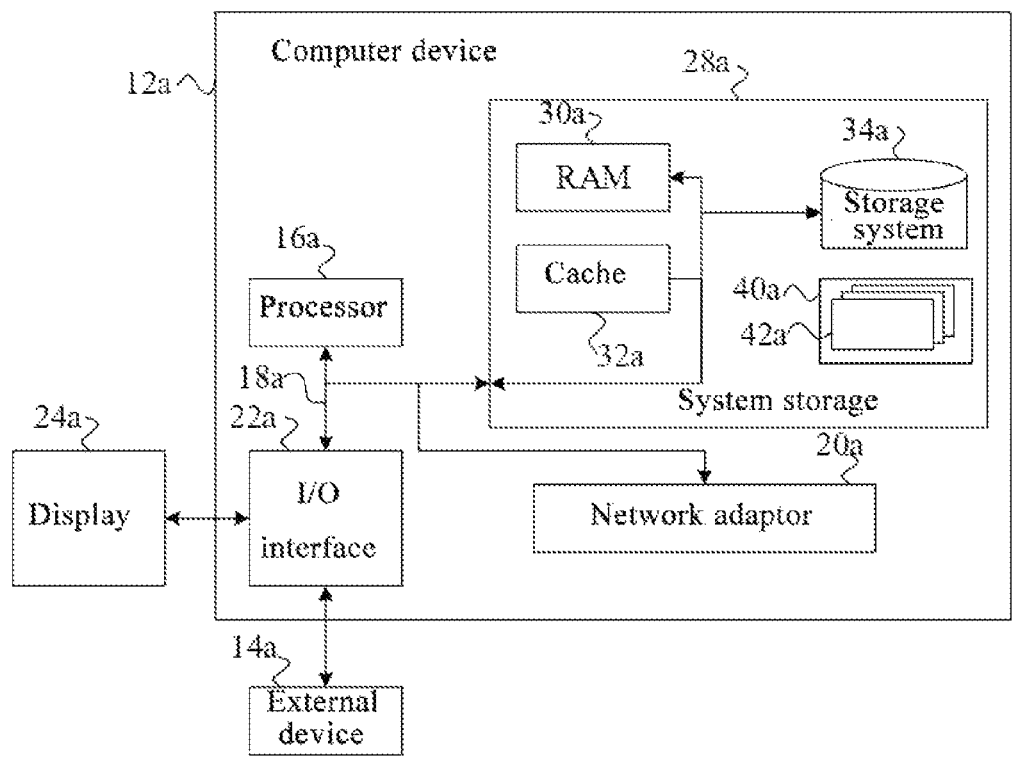
FIG. 9 is an example diagram of a computer device according to an embodiment of the present disclosure.

For example, FIG. 9 is an example diagram of a computer device according to an embodiment of the present disclosure. FIG. 9 shows a block diagram of an example computer device 12a adapted to implement an implementation mode of the present disclosure. The computer device 12a shown in FIG. 9 is only an example and should not bring about any limitation to the function and scope of use of the embodiments of the present disclosure.

As shown in FIG. 9, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1 and FIG. 5 through FIG. 7 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in the above FIG. 1 and FIG. 5-FIG. 7 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 5, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the autonomous vehicle site test method shown in the above embodiments.

The present disclosure further provides a computer readable medium on which a computer program is stored, the program, when executed by a processor, implementing the method for knowledge hierarchical extraction of the text stated in the above embodiments.

The computer readable medium of this embodiment may include RAM30a, and/or cache memory 32a and/or a storage system 34a in the system memory 28a in the embodiment shown in FIG. 9.

As science and technology develops, a propagation channel of the computer program is no longer limited to tangible medium, and it may also be directly downloaded from the network or obtained in other manners. Therefore, the computer readable medium in this embodiment may include a tangible medium as well as an intangible medium.

The computer-readable medium of this embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for knowledge hierarchical extraction of a text, comprising:
    performing word segmentation on a designated text to obtain a word list, the word list including at least one word arranged in a sequence in the designated text;
    analyzing part-of-speech of each word in the word list in the designated text, to obtain a part-of-speech list corresponding to the word list;
    predicting a SPO triple included in the designated text according to the word list, the part-of-speech list and a pre-trained knowledge hierarchical extraction model, comprising:
        inputting the word list and the part-of-speech list into the knowledge hierarchical extraction model; obtaining, by an embedded layer, a word embedding expression based on the word list and a pre-trained word vector list obtaining a part-of-speech embedding expression based on the part-of-speech list and a pre-trained part-of-speech vector list obtaining, by a pre-trained Stacked Recurrent Neural Network layer, a bottom layer embedding expression which is of the designated text and carries context information, based on the word embedding expression and the part-of-speech embedding expression; and through two pre-trained fully-connected layers in turn, predicting a prediction relationship which is included in the designated text and whose prediction probability is greater than a preset probability threshold; further inputting the bottom layer embedding expression, the prediction probability of the prediction relationship and a feature expression corresponding to the prediction relationship into a pre-trained conditional random field network layer for sequence marking, so as to obtain an subject and an object corresponding to the prediction relationship; and outputting the SPO triple consisting of the subject, the object and the prediction relationship.

2. The method according to claim 1, further comprising:
    judging, according to a preset parameter set, whether the SPO triple predicted complies with a SPO triple structure preset in the parameter set, the parameter set comprising at least one preset SPO triple structure, each preset SPO triple structure comprising content of a relationship, and types of a subject and an object;
    if the SPO triple predicted complies with a SPO triple structure preset in the parameter set, determining that the SPO triple predicted is a target SPO triple of the designated text;
    otherwise, if the SPO triple predicted does not comply with a SPO triple structure preset in the parameter set, deleting the SPO triple.

3. The method according to claim 1, further comprising:
    before predicting the SPO triple included in the designated text according to the word list, the part-of-speech list and the pre-trained knowledge hierarchical extraction model,
    collecting a plurality of training texts and a known SPO triple included in each training text;
    training the knowledge hierarchical extraction model with the plurality of training texts and the known SPO triple included in each training text.

4. The method according to claim 3, wherein the training the knowledge hierarchical extraction model with the plurality of training texts and the known SPO triple included in each training texts comprises:
    performing word segmentation for each training text to obtain a training word list; the training word list including at least one training word arranged in a sequence in the training text;
    analyzing a part-of-speech of each training word in the training word list in the training text to obtain a training part-of-speech list corresponding to the training word list;
    training the knowledge hierarchical extraction model according to the training word list and the training part-of-speech list of each training text and known SPO triple in each training text.

5. The method according to claim 4, wherein the training the knowledge hierarchical extraction model according to the training word list and the training part-of-speech list of each training text and the known SPO triple in each training text comprises:
    initializing the word vector list, the part-of-speech vector list, parameters of the Stacked Recurrent Neural Network layer, parameters of the fully-connected layers and parameters of the conditional random field network layer in the knowledge hierarchical extraction model;

inputting the training word list, the training part-of-speech list and the known SPO triple of each training text into the knowledge hierarchical extraction model, to obtain a predicted SPO triple output by the knowledge hierarchical extraction model;

calculating a value of a loss function according to the known SPO triple and the predicted SPO triple;

judging whether the value of the loss function is greater than or equal to a preset threshold;

if the value of the loss function is greater than or equal to a preset threshold, adjusting the word vector list, the part-of-speech vector list, the parameters of the Stacked Recurrent Neural Network layer, the parameters of the fully-connected layers and the parameters of the conditional random field network layer in the knowledge hierarchical extraction model to make the value of the loss function smaller than the preset threshold;

repeating the above steps, and constantly training the knowledge hierarchical extraction model with the training word list, the training part-of-speech list and the known SPO triple of each of the plurality of training texts in the above manner; if training times reach a preset training time threshold, or the value of the loss function is always smaller than a preset threshold within a range of consecutive preset times, determining the word vector list, the part-of-speech vector list, the parameters of the Stacked Recurrent Neural Network layer, the parameters of the fully-connected layers and the parameters of the conditional random field network layer in the knowledge hierarchical extraction model, and thereby determining the knowledge hierarchical extraction model.

6. The method according to claim 1, wherein the pre-trained Stacked Recurrent Neural Network layer includes a plurality of LSTM units, allowing each layer of LSTM units to learn an output sequence of a previous layer in an alternate forward and backward sequence respectively.

7. A computer device, comprising:
one or more processors,
a memory for storing one or more programs,
the one or more programs, when executed by said one or more processors, enable said one or more processors to implement a method for knowledge hierarchical extraction of a text, which comprises:
performing word segmentation on a designated text to obtain a word list, the word list including at least one word arranged in a sequence in the designated text;
analyzing part-of-speech of each word in the word list in the designated text, to obtain a part-of-speech list corresponding to the word list;
predicting a SPO triple included in the designated text according to the word list, the part-of-speech list and a pre-trained knowledge hierarchical extraction model, comprising:
inputting the word list and the part-of-speech list into the knowledge hierarchical extraction model; obtaining, by an embedded layer, a word embedding expression based on the word list and a pre-trained word vector list obtaining a part-of-speech embedding expression based on the part-of-speech list and a pre-trained part-of-speech vector list obtaining, by a pre-trained Stacked Recurrent Neural Network layer, a bottom layer embedding expression which is of the designated text and carries context information, based on the word embedding expression and the part-of-speech embedding expression; and through two pre-trained fully-connected layers in turn, predicting a prediction relationship which is included in the designated text and whose prediction probability is greater than a preset probability threshold; further inputting the bottom layer embedding expression, the prediction probability of the prediction relationship and a feature expression corresponding to the prediction relationship into a pre-trained conditional random field network layer for sequence marking, so as to obtain an subject and an object corresponding to the prediction relationship; and outputting the SPO triple consisting of the subject, the object and the prediction relationship.

8. The computer device according to claim 7, wherein the method further comprises:
judging, according to a preset parameter set, whether the SPO triple predicted complies with a SPO triple structure preset in the parameter set, the parameter set comprising at least one preset SPO triple structure, each preset SPO triple structure comprising content of a relationship, and types of a subject and an object;
if the SPO triple predicted complies with a SPO triple structure preset in the parameter set, determining that the SPO triple predicted is a target SPO triple of the designated text;
otherwise, if the SPO triple predicted does not comply with a SPO triple structure preset in the parameter set, deleting the SPO triple.

9. The computer device according to claim 7, wherein the method further comprises:
before predicting the SPO triple included in the designated text according to the word list, the part-of-speech list and the pre-trained knowledge hierarchical extraction model,
collecting a plurality of training texts and a known SPO triple included in each training text;
training the knowledge hierarchical extraction model with the plurality of training texts and the known SPO triple included in each training text.

10. The computer device according to claim 9, wherein the training the knowledge hierarchical extraction model with the plurality of training texts and the known SPO triple included in each training texts comprises:
performing word segmentation for each training text to obtain a training word list; the training word list including at least one training word arranged in a sequence in the training text;
analyzing a part-of-speech of each training word in the training word list in the training text to obtain a training part-of-speech list corresponding to the training word list;
training the knowledge hierarchical extraction model according to the training word list and the training part-of-speech list of each training text and known SPO triple in each training text.

11. The computer device according to claim 10, wherein the training the knowledge hierarchical extraction model according to the training word list and the training part-of-speech list of each training text and the known SPO triple in each training text comprises:
initializing the word vector list, the part-of-speech vector list, parameters of the Stacked Recurrent Network layer, parameters of the fully-connected layers and parameters of the conditional random field network layer in the knowledge hierarchical extraction model;

inputting the training word list, the training part-of-speech list and the known SPO triple of each training text into the knowledge hierarchical extraction model, to obtain a predicted SPO triple output by the knowledge hierarchical extraction model;

calculating a value of a loss function according to the known SPO triple and the predicted SPO triple;

judging whether the value of the loss function is greater than or equal to a preset threshold;

if the value of the loss function is greater than or equal to a preset threshold, adjusting the word vector list, the part-of-speech vector list, the parameters of the Stacked Recurrent Neural Network layer, the parameters of the fully-connected layers and the parameters of the conditional random field network layer in the knowledge hierarchical extraction model to make the value of the loss function smaller than the preset threshold;

repeating the above steps, and constantly training the knowledge hierarchical extraction model with the training word list, the training part-of-speech list and the known SPO triple of each of the plurality of training texts in the above manner; if training times reach a preset training time threshold, or the value of the loss function is always smaller than a preset threshold within a range of consecutive preset times, determining the word vector list, the part-of-speech vector list, the parameters of the Stacked Recurrent Neural Network layer, the parameters of the fully-connected layers and the parameters of the conditional random field network layer in the knowledge hierarchical extraction model, and thereby determining the knowledge hierarchical extraction model.

12. The computer device according to claim 7, wherein the pre-trained Stacked Recurrent Neural Network layer includes a plurality of LSTM units, allowing each layer of LSTM units to learn an output sequence of a previous layer in an alternate forward and backward sequence respectively.

13. A non-transitory computer readable medium on which a computer program is stored, wherein the program, when executed by a processor, implements a method for knowledge hierarchical extraction of a text, which comprises:

performing word segmentation on a designated text to obtain a word list, the word list including at least one word arranged in a sequence in the designated text;

analyzing part-of-speech of each word in the word list in the designated text, to obtain a part-of-speech list corresponding to the word list;

predicting a SPO triple included in the designated text according to the word list, the part-of-speech list and a pre-trained knowledge hierarchical extraction model, comprising:

inputting the word list and the part-of-speech list into the knowledge hierarchical extraction model; obtaining, by an embedded layer, a word embedding expression based on the word list and a pre-trained word vector list obtaining a part-of-speech embedding expression based on the part-of-speech list and a pre-trained part-of-speech vector list obtaining, by a pre-trained Stacked Recurrent Neural Network layer, a bottom layer embedding expression which is of the designated text and carries context information, based on the word embedding expression and the part-of-speech embedding expression; and through two pre-trained fully-connected layers in turn, predicting a prediction relationship which is included in the designated text and whose prediction probability is greater than a preset probability threshold; further inputting the bottom layer embedding expression, the prediction probability of the prediction relationship and a feature expression corresponding to the prediction relationship into a pre-trained conditional random field network layer for sequence marking, so as to obtain an subject and an object corresponding to the prediction relationship; and outputting the SPO triple consisting of the subject, the object and the prediction relationship.

14. The non-transitory computer readable medium according to claim 13, wherein the method further comprises:

judging, according to a preset parameter set, whether the SPO triple predicted complies with a SPO triple structure preset in the parameter set, the parameter set comprising at least one preset SPO triple structure, each preset SPO triple structure comprising content of a relationship, and types of a subject and an object;

if the SPO triple predicted complies with a SPO triple structure preset in the parameter set, determining that the SPO triple predicted is a target SPO triple of the designated text;

otherwise, if the SPO triple predicted does not comply with a SPO triple structure preset in the parameter set, deleting the SPO triple.

15. The non-transitory computer readable medium according to claim 13, wherein the method further comprises:

before predicting the SPO triple included in the designated text according to the word list, the part-of-speech list and the pre-trained knowledge hierarchical extraction model, collecting a plurality of training texts and a known SPO triple included in each training text;

training the knowledge hierarchical extraction model with the plurality of training texts and the known SPO triple included in each training text.

16. The non-transitory computer readable medium according to claim 15, wherein the training the knowledge hierarchical extraction model with the plurality of training texts and the known SPO triple included in each training texts comprises:

performing word segmentation for each training text to obtain a training word list; the training word list including at least one training word arranged in a sequence in the training text;

analyzing a part-of-speech of each training word in the training word list in the training text to obtain a training part-of-speech list corresponding to the training word list;

training the knowledge hierarchical extraction model according to the training word list and the training part-of-speech list of each training text and known SPO triple in each training text.

17. The non-transitory computer readable medium according to claim 16, wherein the training the knowledge hierarchical extraction model according to the training word list and the training part-of-speech list of each training text and the known SPO triple in each training text comprises:

initializing the word vector list, the part-of-speech vector list, parameters of the Stacked Recurrent Neural Network layer, parameters of the fully-connected layers and parameters of the conditional random field network layer in the knowledge hierarchical extraction model;

inputting the training word list, the training part-of-speech list and the known SPO triple of each training text into the knowledge hierarchical extraction model, to obtain a predicted SPO triple output by the knowledge hierarchical extraction model;

calculating a value of a loss function according to the known SPO triple and the predicted SPO triple;

judging whether the value of the loss function is greater than or equal to a preset threshold;

if the value of the loss function is greater than or equal to a preset threshold, adjusting the word vector list, the part-of-speech vector list, the parameters of the Stacked Recurrent Neural Network layer, the parameters of the fully-connected layers and the parameters of the conditional random field network layer in the knowledge hierarchical extraction model to make the value of the loss function smaller than the preset threshold;

repeating the above steps, and constantly training the knowledge hierarchical extraction model with the training word list, the training part-of-speech list and the known SPO triple of each of the plurality of training texts in the above manner; if training times reach a preset training time threshold, or the value of the loss function is always smaller than a preset threshold within a range of consecutive preset times, determining the word vector list, the part-of-speech vector list, the parameters of the Stacked Recurrent Neural Network layer, the parameters of the fully-connected layers and the parameters of the conditional random field network layer in the knowledge hierarchical extraction model, and thereby determining the knowledge hierarchical extraction model.

* * * * *